(12) United States Patent
Gulevich et al.

(10) Patent No.: US 7,371,802 B2
(45) Date of Patent: May 13, 2008

(54) COMPONENTS AND CATALYSTS FOR THE POLYMERIZATION OF OLEFINS

(75) Inventors: Yuri Gulevich, Ferrara (IT); Giampiero Morini, Padova (IT); Maria Fusto, Ferrara (IT)

(73) Assignee: Basell Poliolefine Italia s.r.l., Milan (IT)

( * ) Notice: Subject to any disclaimer, the term of this patent is extended or adjusted under 35 U.S.C. 154(b) by 27 days.

(21) Appl. No.: 10/577,694

(22) PCT Filed: Oct. 13, 2004

(86) PCT No.: PCT/EP2004/011487

§ 371 (c)(1), (2), (4) Date: Apr. 28, 2006

(87) PCT Pub. No.: WO2005/047351

PCT Pub. Date: May 26, 2005

(65) Prior Publication Data

US 2007/0106039 A1    May 10, 2007

Related U.S. Application Data

(60) Provisional application No. 60/515,914, filed on Oct. 29, 2003.

(30) Foreign Application Priority Data

Oct. 28, 2003  (EP)  .................................. 03103995

(51) Int. Cl.
*C08F 4/44* (2006.01)
*C08F 210/00* (2006.01)

(52) U.S. Cl. ................. 526/140; 526/124.2; 526/124.3; 526/348; 502/103; 502/122; 502/133

(58) Field of Classification Search ................. 526/140, 526/124.2, 124.3, 348; 502/103, 122, 133
See application file for complete search history.

(56) References Cited

U.S. PATENT DOCUMENTS

| 4,220,554 | A |   | 9/1980  | Scata et al. .................. 502/119   |
| 4,298,718 | A |   | 11/1981 | Mayr et al. ............... 526/124.2    |
| 4,399,054 | A |   | 8/1983  | Ferraris et al. ............. 502/125    |
| 4,469,648 | A |   | 9/1984  | Ferraris et al. ................. 264/9  |
| 4,495,338 | A |   | 1/1985  | Mayr et al. ............... 526/124.2    |
| 4,525,555 | A | * | 6/1985  | Tajima et al. ............. 526/125.3    |
| 4,725,656 | A | * | 2/1988  | Kashiwa et al. .......... 526/125.3      |

FOREIGN PATENT DOCUMENTS

| EP | 553806      | 8/1993  |
| EP | 601525      | 6/1994  |
| EP | 395083      | 11/1997 |
| EP | 553805      | 4/1998  |
| WO | 98/44001    | 10/1998 |
| WO | 2005/058982 | 6/2005  |

* cited by examiner

*Primary Examiner*—Ling-Sui Choi
(74) *Attorney, Agent, or Firm*—William R. Reid

(57) ABSTRACT

The present invention relates to a solid catalyst component for the polymerization of olefins $CH_2=CHR$ in which R is hydrogen or a hydrocarbon radical with 1-12 carbon atoms, comprising Mg, Ti, halogen and an electron donor selected from thiophene dicarboxylate derivatives of a particular formula. Said catalyst components when used in the polymerization of olefins, and in particular of propylene, are capable to give polymers in high yields and with high isotactic index expressed in terms of high xylene insolubility.

10 Claims, No Drawings

COMPONENTS AND CATALYSTS FOR THE POLYMERIZATION OF OLEFINS

This application is the U.S. national phase of International Application PCT/EP2004/011487, filed Oct. 13, 2004, claiming priority to European Patent Application 03103995.1 filed Oct. 28, 2003, and the benefit under 35 U.S.C. 119(e) of U.S. Provisional Application No. 60/515,914, filed Oct. 29, 2003; the disclosures of International Application PCT/EP2004/011487, European Patent Application 03103995.1 and U.S. Provisional Application No. 60/515,914, each as filed, are incorporated herein by reference.

The present invention relates to catalyst components for the polymerization of olefins, to the catalyst obtained therefrom and to the use of said catalysts in the polymerization of olefins. In particular the present invention relates to catalyst components, suitable for the stereospecific polymerization of olefins, comprising Ti, Mg, halogen and an electron donor compound selected from thiophene dicarboxylate derivatives. Said catalyst components when used in the polymerization of olefins, and in particular of propylene, are capable to give polymers in high yields and with high isotactic index expressed in terms of high xylene insolubility.

The use of some thiophene dicarboxylate derivatives as electron donor compounds for the preparation of olefin polymerization catalysts is known in the art. U.S. Pat. No. 4,525,555 for example mentions di-methyl thiophene-2,3-dicarboxylate and di-ethyl thiophene-2,3-dicarboxylate among the electron donor compounds that can possibly be used in the catalyst preparation. Their use however is never exemplified. U.S. Pat. No. 4,725,656 describes preparation of a Mg, Ti and halogen containing catalyst in which at least an electron donor is used. The electron donor can be selected among several classes of cyclic mono- or polyester compounds and, among them, di-n-butyl thiophene-2,3-dicarboxylate and di-i-octyl thiophene-3,4-dicarboxylate are mentioned although not exemplified.

In the attempt of developing catalysts for the polymerization of olefins capable to give in high yields stereoregular polymers the applicant has carried out some polymerization tests employing catalyst components containing the above compounds as internal donors. As shown in the experimental section, the catalysts gave an unsatisfactory activity/stereospecificity balance.

It has been therefore very surprising to discover that the use of certain thiophene dicarboxylate derivatives, specifically substituted, gives catalyst components having an increased activity and stereospecificity with respect to the catalyst components containing the thiophene derivatives of the prior art.

It is therefore an object of the present invention to provide a solid catalyst component for the polymerization of olefins $CH_2=CHR$ in which R is hydrogen or a hydrocarbon radical with 1-12 carbon atoms, comprising Mg, Ti, halogen and an electron donor selected from thiophene derivatives of formula (I)

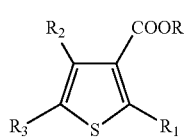

(I)

wherein R is a branched alkyl group, $R_1$, $R_2$ and $R_3$, same or different, are hydrogen, halogen, $R^4$, $OR^4$, $COOR^4$, $SR^4$, $NR^4_2$ and $PR^4_2$, wherein $R^4$ is a linear or branched $C_1$-$C_{20}$ alkyl, $C_2$-$C_{20}$ alkenyl, $C_3$-$C_{20}$ cycloalkyl, $C_6$-$C_{20}$ aryl, $C_7$-$C_{20}$ alkylaryl or $C_7$-$C_{20}$ arylalkyl group, optionally containing one or more heteroatoms, and two or more of said $R_1$-$R_3$ groups can also be joined to form a cycle, with the provisions that at least one of $R_1$ and $R_2$ is $COOR^4$ and that when $R_2$ is COO-i-octyl and R is i-octyl, $R_1$ and/or $R_3$ are different from hydrogen.

R is preferably a primary branched alkyl having from 4 to 15 carbon atoms and especially from 4 to 10 carbon atoms. Particularly preferred groups are isobutyl, isopentyl, neopentyl, 2-methyl-butyl, 2-ethyl-butyl and 2-ethyl-hexyl.

Among the thiophene dicarboxylate derivatives of formula (I) one particularly preferred group is that of 3,4-dicarboxylates, those in which $R_2$ is a COOR group. In this case it is particularly preferred that $R_1$ and/or $R_3$ is a C1-C20 alkyl group. Particularly preferred are the compounds in which only $R_1$ or $R_3$ is different from hydrogen.

Another subgroup of preferred dicarboxylate derivatives is those of the 2,3-dicarboxylates, i.e. those in which $R_1$ is a COOR group. Also in this case it is preferable to have at least one of $R_2$ and $R_3$ different from hydrogen. More preferably, only one of $R_2$ and $R_3$, preferably $R_3$ is different from hydrogen and in particular selected among C1-C20 alkyl groups.

Specific examples of useful thiophene dicarboxylate derivatives are di-isobutyl thiophene-2,3-dicarboxylate, di-isobutyl thiophene-3,4-dicarboxylate, di-isobutyl 5-methyl-thiophene-2,3-dicarboxylate, di-isobutyl 2-methyl-thiophene-3,4-dicarboxylate, di-isobutyl 2,5-di-methyl-thiophene-3,4-dicarboxylate, di-isobutyl 5-isopropyl-thiophene-2,3-dicarboxylate, di-isobutyl 2-isopropyl-thiophene-3,4-dicarboxylate, di-isobutyl 2-chloro-thiophene-3,4-dicarboxylate, di-isobutyl 2-bromo-thiophene-3,4-dicarboxylate, di-isobutyl 2,5-di-chloro-thiophene-3,4-dicarboxylate, di-isobutyl 2,5-di-bromo-thiophene-3,4-dicarboxylate, di-isobutyl 5-chloro-thiophene-2,3-dicarboxylate, di-isobutyl 5-bromo-thiophene-2,3-dicarboxylate, di-isobutyl 4,5-di-chloro-thiophene-2,3-dicarboxylate, di-isobutyl 4,5-di-bromo-thiophene-2,3-dicarboxylate, di-isobutyl 5-ethyl-thiophene-2,3-dicarboxylate, di-isobutyl 5-propyl-thiophene-2,3-dicarboxylate, di-isobutyl 5-butyl-thiophene-2,3-dicarboxylate, di-isobutyl 5-isobutyl-thiophene-2,3-dicarboxylate, di-isopentyl thiophene-2,3-dicarboxylate, di-isopentyl thiophene-3,4-dicarboxylate, di-isopentyl 5-methyl-thiophene-2,3-dicarboxylate, di-isopentyl 2-methyl-thiophene-3,4-dicarboxylate, di-isopentyl 2,5-di-methyl-thiophene-3,4-dicarboxylate, di-isopentyl 5-isopropyl-thiophene-2,3-dicarboxylate, di-isopentyl 2-isopropyl-thiophene-3,4-dicarboxylate, di-neopentyl thiophene-2,3-dicarboxylate, di-neopentyl thiophene-3,4-dicarboxylate, di-neopentyl 5-methyl-thiophene-2,3-dicarboxylate, di-neopentyl 2-methyl-thiophene-3,4-dicarboxylate, di-neopentyl 2,5-di-methyl-thiophene-3,4-dicarboxylate, di-neopentyl 5-isopropyl-thiophene-2,3-dicarboxylate, di-neopentyl 2-isopropyl-thiophene-3,4-dicarboxylate.

As explained above, the catalyst components of the invention comprise, in addition to the above electron donors, Ti, Mg and halogen. In particular, the catalyst components comprise a titanium compound, having at least a Ti-halogen bond and the above mentioned electron donor compound supported on a Mg halide. The magnesium halide is preferably MgCl$_2$ in active form which is widely known from the patent literature as a support for Ziegler-Natta catalysts. U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds used in the catalyst component of the present invention are TiCl$_4$ and TiCl$_3$; furthermore, also Ti-haloalcoholates of formula Ti(OR)$_{n-y}$X$_y$, where n is the valence of titanium and y is a number between 1 and n, can be used.

The preparation of the solid catalyst component can be carried out according to several methods.

According to one of these methods, the magnesium dichloride in an anhydrous state and the thiophene derivative are milled together under conditions in which activation of the magnesium dichloride occurs. The so obtained product can be treated one or more times with an excess of TiCl$_4$ at a temperature between 80 and 135° C. This treatment is followed by washings with hydrocarbon solvents until chloride ions disappear. According to a further method, the product obtained by co-milling the magnesium chloride in an anhydrous state, the titanium compound and the thiophene derivative is treated with halogenated hydrocarbons such as 1,2-dichloroethane, chlorobenzene, dichloromethane, etc. The treatment is carried out for a time between 1 and 4 hours and at temperature of from 40° C. to the boiling point of the halogenated hydrocarbon. The product obtained is then generally washed with inert hydrocarbon solvents such as hexane.

According to another method, magnesium dichloride is preactivated according to well known methods and then treated at a temperature of about 80 to 135° C. with an excess of TiCl$_4$ which contains, in solution, a thiophene derivative. The treatment with TiCl$_4$ is repeated and the solid is washed with hexane in order to eliminate any non-reacted TiCl$_4$.

A further method comprises the reaction between magnesium alcoholates or chloroalcoholates (in particular chloroalcoholates prepared according to U.S. Pat. No. 4,220,554) and an excess of TiCl$_4$ comprising the thiophene derivative in solution at a temperature of about 80 to 120° C.

According to a preferred method, the solid catalyst component can be prepared by reacting a titanium compound of formula Ti(OR)$_{n-y}$X$_y$, where n is the valence of titanium and y is a number between 1 and n, preferably TiCl$_4$, with a magnesium chloride deriving from an adduct of formula MgCl$_2$.pROH, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermal controlled dealcoholation (80-130° C.) so as to obtain an adduct in which the number of moles of alcohol is generally lower than 3 preferably between 0.1 and 2.5. The reaction with the Ti compound can be carried out by suspending the adduct (dealcoholated or as such) in cold TiCl$_4$ (generally 0° C.); the mixture is heated up to 80-130° C. and kept at this temperature for 0.5-2 hours. The treatment with TiCl$_4$ can be carried out one or more times. The thiophene derivative can be added during the treatment with TiCl$_4$. The treatment with the electron donor compound can be repeated one or more times.

The preparations of catalyst components in spherical form are described for example in European Patent Applications EP-A-395083, EP-A-553805, EP-A-553806, EPA-601525 and WO98/44001.

The solid catalyst components obtained according to the above method show a surface area (by B.E.T. method) generally between 20 and 500 m$^2$/g and preferably between 50 and 400 m$^2$/g, and a total porosity (by B.E.T. method) higher than 0.2 cm$^3$/g preferably between 0.2 and 0.6 cm$^3$/g. The porosity (Hg method) due to pores with radius up to 10,000 Å generally ranges from 0.3 to 1.5 cm$^3$/g, preferably from 0.45 to 1 cm$^3$/g.

A further method to prepare the solid catalyst component of the invention comprises halogenating magnesium dihydrocarbyloxide compounds, such as magnesium dialkoxide or diaryloxide, with solution of TiCl$_4$ in aromatic hydrocarbon (such as toluene, xylene etc.) at temperatures between 80 and 130° C. The treatment with TiCl$_4$ in aromatic hydrocarbon solution can be repeated one or more times, and the thiophene derivative is added during one or more of these treatments.

In any of these preparation methods the desired thiophene derivative can be added as such or, in an alternative way, it can be obtained in situ by using an appropriate precursor capable to be transformed in the desired electron donor compound by means, for example, of known chemical reactions such as esterification, transesterification, etc. Generally, the thiophene derivative is used in molar ratio with respect to the MgCl$_2$ of from 0.01 to 1 preferably from 0.05 to 0.5.

The solid catalyst components according to the present invention are converted into catalysts for the polymerization of olefins by reacting them with organoaluminum compounds according to known methods.

In particular, it is an object of the present invention a catalyst for the polymerization of olefins CH$_2$=CHR, in which R is hydrogen or a hydrocarbyl radical with 1-12 carbon atoms, comprising the product of the reaction between:

(a) a solid catalyst component comprising a Mg, Ti and halogen and an electron donor selected from thiophene derivatives of formula (I)

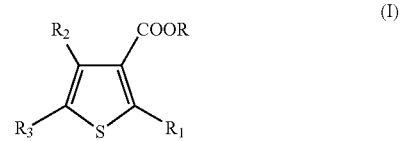

wherein R is a branched alkyl group, R$_1$, R$_2$ and R$_3$, same or different, are hydrogen, halogen, R$^4$, OR$^4$, OCOR$^4$, SR$^4$, NR$^4_2$ and R$^4_2$, wherein R$^4$ is a linear or branched, saturated or unsaturated C$_1$-C$_{20}$ alkyl, C$_3$-C$_{20}$ cycloalkyl, C$_6$-C$_{20}$ aryl, $C_7$-$C_{20}$ alkylaryl or $C_7$-$C_{20}$ arylalkyl group, optionally containing one or more heteroatoms, and two or more of said $R_1$-$R_3$ groups can also be joined to form a cycle, with the provisions that at least one of $R_1$ and $R_2$ is $COOR^4$ and that when $R_2$ is COO-i-octyl and R is i-octyl, $R_1$ and/or $R_3$ are different from hydrogen.

(a) an alkylaluminum compound and, optionally, (b) one or more electron-donor compounds (external donor).

The alkyl-Al compound (b) is preferably selected from the trialkyl aluminum compounds such as for example triethylaluminum, triisobutylaluminum, tri-n-butylaluminum, tri-n-hexylaluminum and tri-n-octylaluminum. It is also possible to use mixtures of trialkylaluminum's with alkylaluminum halides, alkylaluminum hydrides or alkylaluminum sesquichlorides such as $AlEt_2Cl$ and $Al_2Et_3Cl_3$.

The external donor (c) can be of the same type or it can be different from the thiophene derivative. Suitable external electron-donor compounds include silicon compounds, ethers, esters such as ethyl 4-ethoxybenzoate, amines, heterocyclic compounds and particularly 2,2,6,6-tetramethyl piperidine, ketones and the 1,3-diethers of the general formula (II):

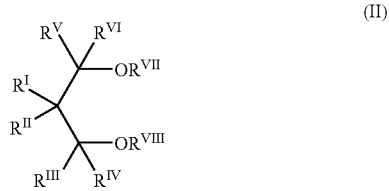

(II)

wherein $R^I$, $R^{II}$, $R^{III}$, $R^{IV}$, $R^V$ and $R^{VI}$ equal or different to each other, are hydrogen or hydrocarbon radicals having from 1 to 18 carbon atoms, and $R^{VII}$ and $R^{VIII}$, equal or different from each other, have the same meaning of $R^I$-$R^{VIII}$ except that they cannot be hydrogen; one or more of the $R^I$-$R^{VIII}$ groups can be linked to form a cycle. Particularly preferred are the 1,3-diethers in which $R^{VII}$ and $R^{VIII}$ are selected from $C_1$-$C_4$ alkyl radicals.

Another class of preferred external donor compounds is that of silicon compounds of formula $R_a^5R_b^6Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. Particularly preferred are the silicon compounds in which a is 1, b is 1, c is 2, at least one of $R^5$ and $R^6$ is selected from branched alkyl, cycloalkyl or aryl groups with 3-10 carbon atoms optionally containing heteroatoms and $R^7$ is a $C_1$-$C_{10}$ alkyl group, in particular methyl. Examples of such preferred silicon compounds are methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1,trifluoropropyl-2-ethylpiperidinyl-dimethoxysilane. Moreover, are also preferred the silicon compounds in which a is 0, c is 3, $R^6$ is a branched alkyl or cycloalkyl group, optionally containing heteroatoms, and $R^7$ is methyl. Examples of such preferred silicon compounds are cyclohexyltrimethoxysilane, t-butyltrimethoxysilane and thexyltrimethoxysilane.

The electron donor compound (c) is used in an amount suitable to give a molar ratio between the organoaluminum compound and said electron donor compound (c) of from 0.1 to 500, preferably from 1 to 300 and more preferably from 3 to 100. As previously indicated, when used in the (co) polymerization of olefins, and in particular of propylene, the catalysts of the invention allow to obtain, with high yields, polymers having a high isotactic index (expressed by high xylene insolubility X.I.), thus showing an excellent balance of properties. This is particularly surprising in view of the fact that, as it can be seen from the comparative examples herebelow reported, the use as internal electron donors of the thiophene compounds of the prior art gives worse results in term of yields and/or xylene insolubility.

Therefore, it constitutes a further object of the present invention a process for the (co)polymerization of olefins, carried out in the presence of a catalyst comprising the product of the reaction between:

(a) a solid catalyst component as defined above;

(b) an alkylaluminum compound and, optionally, (c) one or more electron-donor compounds (external donor).

Preferred olefins to be (co)polymerized are the alpha olefins having from 2 to 12 carbon atoms. In particular, ethylene, propylene, butene-1, hexene-1 and octene-1. Among them ethylene, propylene, butene-1 and mixture thereof are especially preferred. The polymerization process can be carried out according to known techniques, for example slurry polymerization using as diluent an inert hydrocarbon solvent or bulk polymerization using the liquid monomer (for example propylene) as a reaction medium. Moreover, it is possible carrying out the polymerization process in gas-phase operating in one or more fluidized or mechanically agitated bed reactors.

The polymerization is generally carried out at temperature of from 20 to 120° C., preferably of from 40 to 80° C. When the polymerization is carried out in gas-phase the operating pressure is generally between 0.5 and 10 MPa, preferably between 1 and 5 MPa. In the bulk polymerization the operating pressure is generally between 1 and 6 MPa preferably between 1.5 and 4 MPa. Hydrogen or other compounds capable to act as chain transfer agents can be used to control the molecular weight of polymer.

The following examples are given in order to better illustrate the invention without limiting it.

Characterizations

Preparation of Thiophene Derivatives

Thiophene dicarboxylate derivatives can be prepared according to the following illustrative procedures.

Di-isobutyl thiophene-3,4-dicarboxylate

A mechanically stirred slurry of 5.00 g of thiophene-3,4-dicarboxylic acid (purchased from Aldrich) in 58.2 mL of 2-methyl-1-propanol was treated with 11.0 mL of chlorotrimethylsilane at room temperature. After completion of the addition, the reaction mixture was stirred at room temperature for 1 h, then at 65° C. for one day, quenched with water at 0° C. and extracted with ether. The combined organic phases were washed with saturated water solution of sodium carbonate, brine, dried over magnesium sulfate, filtered, concentrated on a rotary evaporator, and distilled in vacuum to give 7.86 g (95%) of the title compound of 99.6% GC-purity (bp 113° C./1 mm Hg; colorless oil).

Di-isobutyl thiophene-2,3-dicarboxylate

Thiophene-2,3-dicarboxylic acid: A solution of 25.0 g of 3-methyl-2-thiophene-carboxylic acid (purchased from Aldrich) in 880 mL of 10% aqueous NaOH was treated portionwise with 62.6 g of potassium permanganate at room temperature. The reaction mixture was stirred at 50° C. for three days, then carefully acidified with diluted sulfuric acid and treated with sodium metabisulfite to dissolve all formed during the reaction manganese dioxide. The mixture was then saturated with sodium chloride and extracted with ethyl acetate. The combined organic phases were dried over magnesium sulfate, filtered and concentrated on a rotary evaporator. Thus obtained crystalline product was triturated with chloroform, filtered and then dried to give 14.4 g (48%) of pure thiophene-2,3-dicarboxylic acid as a white crystalline solid.

Di-isobutyl thiophene-2,3-dicarboxylate: A mechanically stirred slurry of 7.00 g of thiophene-2,3-dicarboxylic acid in 82.0 mL of 2-methyl-1-propanol was treated with 15.4 mL of chlorotrimethylsilane at room temperature. After completion of the addition, the reaction mixture was stirred at room temperature for 1 h, then at 65° C. for one day, quenched with water at 0° C. and extracted with ether. The combined organic phases were washed with saturated water solution of sodium carbonate, brine, dried over magnesium sulfate, filtered, concentrated on a rotary evaporator, and distilled in vacuum to give 10.5 g (91%) of the title compound of 99.9% GC-purity (bp 111° C./1 mm Hg; colorless oil).

Propylene Polymerization: General Procedure

A 4-liter autoclave was purged with a nitrogen flow at 70° C. for one hour and then charged at 30° C. under a propylene flow with 75 mL of anhydrous hexane containing 800 mg of AlEt$_3$, 79.8 mg of dicyclopentyldimethoxysilane and 10 mg of solid catalyst component. The autoclave was closed. After that, 1.5 NL of hydrogen were added to the autoclave and then, under stirring, 1.2 Kg of liquid propylene were fed. The temperature was raised to 70° C. in five minutes and the polymerization was carried out at this temperature for two hours. The unreacted propylene was removed. The obtained polymer was recovered, dried at 70° C. under vacuum for three hours, weighed and then fractionated with o-xylene at 25° C. to determine the amount of the xylene insoluble fraction (X.I.).

Determination of X.I.

2.5 g of polymer were dissolved in 250 mL of o-xylene under stirring at 135° C. for 30 minutes. Then the solution was cooled to 25° C. and after 30 minutes the insoluble polymer fraction was filtered off. The resulting solution was evaporated in a nitrogen flow and the residue was dried and weighed to determine the percentage of soluble polymer and then, by difference, the xylene insoluble fraction (%).

EXAMPLES

Examples 1-3 and Comparative Example 4

Preparation of Solid Catalyst Components

Into a 500 mL four-necked round flask, purged with nitrogen, 250 mL of TiCl$_4$ were introduced at 0° C. While stirring, 10.0 g of microspheroidal MgCl$_2$.2.8C$_2$H$_5$OH (prepared according to the method described in ex. 2 of U.S. Pat. No. 4,399,054 but operating at 3,000 rpm instead of 10,000) and 7.4 mMoles of thiophene derivative were added. The temperature was raised to 100° C. and maintained for 120 min. Then the stirring was discontinued, the solid product was allowed to settle and the supernatant liquid was siphoned off.

250 mL of fresh TiCl$_4$ were added. The mixture was reacted at 120° C. for 60 min and then the supernatant liquid was siphoned off. The solid was washed six times with anhydrous hexane (6×100 mL) at 60° C. Finally, the solid was dried under vacuum and analyzed. The type and amount of thiophene derivative (wt %) and the amount of Ti (wt %) contained in the solid catalyst component are reported in table 1. Polymerization results are reported in table 2.

TABLE 1

| | Thiophene derivative | | Ti |
|---|---|---|---|
| Example | Type | Wt % | Wt % |
| 1 | di-isobutyl thiophene-3,4-dicarboxylate | 18.5 | 3.3 |
| 2 | di-isobutyl thiophene-2,3-dicarboxylate | 13.9 | 2.9 |
| 3 | di-isobutyl 5-methyl-thiophene-2,3-dicarboxylate | 16.6 | 2.6 |
| Comp. 4 | di-ethyl thiophene-3,4-dicarboxylate | 19.6 | 4.0 |

TABLE 2

| Example | Yield KgPP/gCat | X.I. Wt % |
|---|---|---|
| 1 | 41 | 98.3 |
| 2 | 30 | 97.5 |
| 3 | 48 | 97.5 |
| Comp. 4 | 11 | 96.4 |

The invention claimed is:

1. A solid catalyst component for the polymerization of olefins comprising Mg, Ti, halogen and an electron donor selected from thiophene derivatives of formula (I):

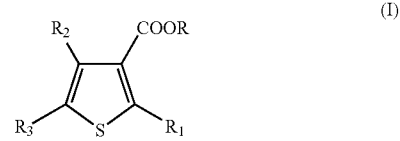

wherein R is a branched alkyl group, $R_1$, $R_2$ and $R_3$, same or different, are hydrogen, halogen, $R^4$, $OR^4$, $COOR^4$, $SR^4$, $NR^4_2$ or $PR^4_2$, wherein $R^4$ is a linear or branched $C_1$-$C_{20}$ alkyl, $C_2$-$C_{20}$ alkenyl, $C_3$-$C_{20}$ cycloalkyl, $C_6$-$C_{20}$ aryl, $C_7$-$C_{20}$ alkylaryl or $C_7$-$C_{20}$ arylalkyl group, optionally containing at least one heteroatom, and at least two of said $R_1$-$R_3$ groups can also be joined to form a cycle, with the proviso that at least one of $R_1$ and $R_2$ is $COOR^4$ and that when $R_2$ is COO-i-octyl and R is i-octyl, at least one of $R_1$ and $R_3$ are different from hydrogen.

2. The catalyst component according to claim 1 in which in the thiophene derivatives of formula (I), R is a primary branched alkyl having from 4 to 15 carbon atoms.

3. The catalyst component according to claim 1 in which in the thiophene derivatives of formula (I), $R_2$ is a COOR group.

4. The catalyst component according to claim 3 in which at least one of $R_1$ and $R_3$ is a C1-C20 alkyl group.

5. The catalyst component according to claim 1 in which in the thiophene derivatives of formula (I), $R_1$ is a COOR group.

6. The catalyst component according to claim 5 in which one of $R_2$ and $R_3$ of formula (I) are different from hydrogen.

7. The catalyst component of claim 1 comprising a titanium compound having at least a Ti-halogen bond and the thiophene derivatives of formula (I) supported on a Mg halide in active form.

8. A catalyst for the polymerization of olefins comprising the product of the reaction between:
   a solid catalyst component comprising Mg, Ti, halogen and an electron donor selected from thiophene derivatives of formula (I):

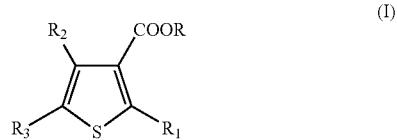

(I)

wherein R is a branched alkyl group, $R_1$, $R_2$ and $R_3$, same or different, are hydrogen, halogen, $R^4$, $OR^4$, $COOR^4$, $SR^4$, $NR^4_2$ or $PR^4_2$, wherein $R^4$ is a linear or branched $C_1$-$C_{20}$ alkyl, $C_2$-$C_{20}$ alkenyl, $C_3$-$C_{20}$ cycloalkyl, $C_6$-$C_{20}$ aryl, $C_7$-$C_{20}$ alkylaryl or $C_7$-$C_{20}$ arylalkyl group, optionally containing at least one heteroatom, and at least two of said $R_1$-$R_3$ groups can also be joined to form a cycle, with the proviso that at least one of $R_1$ and $R_2$ is $COR^4$ and that when $R_2$ is COO-i-octyl and R is i-octyl, at least one of $R_1$ and $R_3$ are different from hydrogen;

an alkylaluminum compound; and optionally,
at least one electron-donor compound (external donor).

9. The catalyst according to claim 8 in which the alkylaluminum compound is a trialkyl aluminum compound.

10. A process comprising (co)polymerizing olefins, the (co)polymerization being carried out in the presence of a catalyst comprising the product of the reaction between:
   a solid catalyst component comprising Mg, Ti, halogen and an electron donor selected from thiophene derivatives of formula (I):

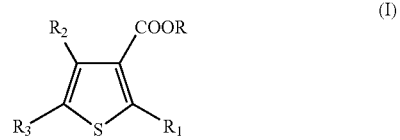

(I)

wherein R is a branched alkyl group, $R_1$, $R_2$ and $R_3$, same or different, are hydrogen, halogen, $R^4$, $OR^4$, $COOR^4$, $SR^4$, $NR^4_2$ or $PR^4_2$, wherein $R^4$ is a linear or branched $C_1$-$C_{20}$ alkyl, $C_2$-$C_{20}$ alkenyl, $C_3$-$C_{20}$ cycloalkyl, $C_6$-$C_{20}$ aryl, $C_7$-$C_{20}$ alkylaryl or $C_7$-$C_{20}$ arylalkyl group, optionally containing at least one heteroatom, and at least two of said $R_1$-$R_3$ groups can also be joined to form a cycle, with the proviso that at least one of $R_1$ and $R_2$ is $COOR^4$ and that when $R_2$ is COO-i-octyl and R is i-octyl, at least one of $R_1$ and $R_3$ are different from hydrogen;

an alkylaluminum compound; and optionally,
at least one electron-donor compound (external donor).

* * * * *